United States Patent [19]
Yufa

[11] Patent Number: 5,969,665
[45] Date of Patent: Oct. 19, 1999

[54] METHOD AND APPARATUS FOR CONTROL OF VESSEL MANEUVERING

[76] Inventor: Aleksandr L. Yufa, P.O. Box 1677, Colton, Calif. 92324

[21] Appl. No.: 09/225,061

[22] Filed: Jan. 4, 1999

[51] Int. Cl.⁶ .................................................... G01S 13/93
[52] U.S. Cl. .............................................. 342/41; 701/301
[58] Field of Search ............................. 342/41; 701/301, 701/201

[56] References Cited

U.S. PATENT DOCUMENTS

| | | | |
|---|---|---|---|
| 2,489,297 | 11/1949 | Labin | 327/13 |
| 2,891,198 | 6/1959 | Gleason | 361/186 |
| 3,151,322 | 9/1964 | Hildebrandt | 342/91 |
| 3,188,631 | 6/1965 | Birtley | 342/96 |
| 3,403,396 | 9/1968 | Van Popta | 342/96 |
| 3,646,557 | 2/1972 | Scheer | 342/183 |
| 3,648,283 | 3/1972 | Busch et al. | 342/183 |
| 3,660,846 | 5/1972 | Anderson | 342/41 |
| 3,706,136 | 12/1972 | Sielaff | 342/176 X |
| 3,717,873 | 2/1973 | Riggs | 342/41 |
| 3,725,918 | 4/1973 | Fleischer et al. | 342/41 |
| 3,735,397 | 5/1973 | Nirasawa | 342/41 X |
| 3,737,902 | 6/1973 | O'Hagan et al. | 342/41 |
| 3,971,018 | 7/1976 | Isbister et al. | 342/41 |
| 3,981,008 | 9/1976 | Mann | 342/41 |
| 4,153,935 | 5/1979 | Jones et al. | 701/301 |
| 4,197,538 | 4/1980 | Stocker | 342/32 |
| 4,205,313 | 5/1980 | Pease | 342/182 |
| 4,281,326 | 7/1981 | Anderson | 342/41 |
| 4,313,115 | 1/1982 | O'Sullivan | 342/41 |
| 4,339,751 | 7/1982 | Pease | 342/41 |
| 4,466,068 | 8/1984 | Degré et al. | 342/41 X |
| 4,623,966 | 11/1986 | O'Sullivan | 364/461 |
| 4,706,090 | 11/1987 | Hashiguchi | 342/41 |
| 5,034,154 | 7/1991 | Ams | 73/365.5 |
| 5,056,411 | 10/1991 | Baker | 89/41.22 |
| 5,111,210 | 5/1992 | Morse | 342/455 |
| 5,153,836 | 10/1992 | Fraughton et al. | 364/461 |
| 5,191,341 | 3/1993 | Gouard et al. | 342/456 |
| 5,307,074 | 4/1994 | Janex | 342/41 |
| 5,313,201 | 5/1994 | Ryan | 340/961 |
| 5,319,373 | 6/1994 | Maxwell et al. | 342/55 |
| 5,381,338 | 1/1995 | Wysocki et al. | 701/207 |
| 5,515,287 | 5/1996 | Hakoyama et al. | 701/301 |

Primary Examiner—John B. Sotomayor

[57] ABSTRACT

An improved method and apparatus provide a control of the vessel maneuvering by a determination and displaying of the dangerous relative course zones, wherein the end of the vessel speed-vector should not be located for the object evasion tactic maneuvering and/or collision avoidance maneuvering and should be located for the object pursuit and/or interception tactic maneuvering. The apparatus comprises an object disposition evaluator, a control system, a dangerous criteria setting system, an initial data processor, at least one display and a dangerous relative course zone determiner, including an interface-signal distributor, a logic processor and signal distributor and a data processing system, comprising a trigonometric function processor, a summator, a multiplier-divider and a data processor. The dangerous relative course zones are displayed on at least one indicator, proving the operator with the possibility to evaluate the danger approach situation and instantly select the anti-collision maneuver for collision preventive maneuvering and/or select an optimal maneuver for the assigned vessel tactic maneuvering execution.

12 Claims, 11 Drawing Sheets

(A PRIOR ART)

from the radar and sensor means

METHOD AND APPARATUS FOR CONTROL OF VESSEL MANEUVERING

FIELD OF THE INVENTION

This invention relates to the control of the vessel maneuvering to supply the operator with an appropriate information for vessel collision prevention and vessel optimal tactic maneuvering.

BACKGROUND OF THE INVENTION

The radar systems are commonly provided upon vessels, for instance, for identifying the presence of the moving objects, which might be the subjects for collision. Such conventional radar systems may include a plan position indicator (hereinafter referred to as PPI), providing representation (by the marks) all objects on the screen, located over the scanned area. Further the conventional radar systems there have been developed a number of very complex radar tracking systems, using for the collision avoidance warning notification. Such radar collision preventive systems are an collision warning alarm system. For example, the collision warning target display system by U.S. Pat. No. 4,281,326 is intended for collision warning alarm actuating by a ship's whistle. This system displays (see FIG. 1) on the scope (PPI) thereof a maximum 20 and minimum 21 range (the concentric rings), defining a warning collision range (distance) for the target 6. The warning area is contained between these two concentric rings.

Also the system can be used for tow warning capability for identifying the straying of a towed barge, for example, from a predetermined tow area. The system indicates on PPI a tow warning area. The tow warning system operates to establish a tow warning area 16 extending about the two safety location 17, indicating on the PPI scope 18, as shown on FIG. 1. Vessels such as barges 19, indicated by small marks for convenience of description, are intended to be towed behind a vessel, which is marked on the PPI scope 18, and to normally remained with the two safety areas 17. If barge or towing vessel moves outside of the safety area 17 into the surrounding warning area 16, the system by U.S. Pat. No. 4,281,326 will sound an alarm to indicate that the towed vessel has either swung laterally from its normal position or has possibly broken free and is lagging too far behind the towing vessel.

Such warning target system, having the warning area contained between two concentric rings, defining by the distance between own ship and target, provides the warning alarm to the operator and has not provided the determination of the vessel (the own object) dangerous relative course zones for selection of the optimal maneuvering, for example, in the narrow fairway with a considerable quantity of the target objects. Additionally, such apparatus can not provide a visual evaluation of the dynamic processes of the non-dangerous maneuvering.

Another ship collision preventive aid apparatus by U.S. Pat. No. 4,706,090 includes a key touch panel, PPI and alarm means. As shown in the U.S. Pat. No. 4,706,090, the anti-collision principles are based on the constructing of the concentric rings, determining the distance between the own ship and other moving objects respectively. Referring to this patent, the indicator (a color cathode-ray tube, hereinafter referred to as CRT) depicts the mentioned above concentric guard rings, suppression rings and object marks. The acquired ships are marked on CRT too. The alarm is adopted to be given, when the target ship crossing the guard ring of the own ship. In contrast with the U.S. Pat. No. 4,706,090, described of the above, this apparatus uses the rectangular CRT and key touch control panel, excluding the mechanical control means.

Such ship collision preventive aid apparatus provides the warning alarm to the operator and has not provided the determination of the vessel dangerous relative course zones for the selection of the optimal maneuvering vector (an optimal maneuvering anti-collision speed-vector). Also such complex apparatus requires a lot of handle operations on key touch panel with a specific algorithm of the manipulation sequence, that take a lot of time for the collision preventive aid apparatus control. Additionally, such apparatus can not provide a visual evaluation of the dynamic processes of the non-dangerous maneuvering and collision avoidance simulation.

Other known methods and apparatus of prior art for collision avoidance (for example, U.S. Pat. Nos. 5,515,287; No. 4,623,966 and the others) disclose more complex processes of anti-collision maneuver selection, requiring longer time for signal processing and resulting information displaying, and more complex structures of the apparatus.

OBJECT AND ADVANTAGES OF THE INVENTION

Accordingly, several objects and advantage of the present invention are to provide an improved method and apparatus for a control of a vessel maneuvering.

It is an object of the invention to provide an improved method and apparatus to extrapolate the vessel collision avoidance maneuvering parameters.

It is another object of the invention to provide an improved method and apparatus for the essential time reduction (up to 2–3 seconds) of the vessel collision avoidance situation evaluation and anti-collision maneuver selection.

It is still another further object of the invention to provide an improved method and apparatus for an operator possibility to make anti-collision tactic decision for the shortest period of time in the extraordinary situation.

It is yet another further object of the invention to provide an improved method and apparatus for the vessel collision preventive situation and anti-collision maneuvering simulation.

It is still further object of the invention to provide an improved method and apparatus for increasing the visual informativeness of the selected maneuvering result.

It is still another object of the invention to provide an improved method and apparatus for increasing the efficiency of the vessel collision preventive maneuvering.

It is yet further object of the invention to provide an improved method and apparatus for the increasing a current tactic data displaying representation informativeness.

It is another further object of the invention to provide an improved method and apparatus for the operator convenience and/or necessity of the vessel anti-collision maneuvering supervision in the dynamical mode.

It is further another object of the invention to provide an improved method and apparatus for stochastic and/or mini-maxi and/or maxi-mini optimal criteria tactic maneuvering, considering the stochastic moving target object or object pursuit-evasion and/or interception tactic maneuvering respectively.

Still, further objects and advantages will become apparent from a consideration of the ensuing description accompanying drawings.

SUMMARY OF THE INVENTION

An improved method and apparatus of the present invention provide a control of the vessel maneuvering. An improved method provides a determination of the zones of the dangerous relative courses for vessel speed-vector. These zones, determined and constructed by an improved method, are imaged on the displaying means, providing a visually informative object disposition evaluation and selection of the optimal maneuvering for the extremely short time. An improved apparatus comprises an object disposition evaluation means, a control means, a dangerous criteria setting means, an initial data processing means, a displaying means and a dangerous relative course zone determination means, including an interface-signal distribution means, a logic processing and signal distribution means and a data processing system, comprising a trigonometric function processing means, a summarizing means, a multiplying-dividing means and a data processing means. The present apparatus cooperates with a conventional radar means and other vessel (own object) subsystems and means, which determine the distances between own object and target objects (for example, an encounter object), bearings of target objects, target object and own speeds and courses, headings, target object and own positions and to consider the metrology conditions and some other factors of the object movements. The improved method and apparatus are intended for maneuvering control of two types of the vessels: the surface moving vessels (ships) and the spatially moving vessels (for example, submarines).

DESCRIPTION OF THE PREFERRED EMBODIMENTS

Here the description of an improved method and apparatus will be done in statics (as if the components of the improved device are suspended in the space) with description of their relative locations and connections to each other. The description of the improved method and functional operations of an improved apparatus will be done hereinafter.

Figure 1:
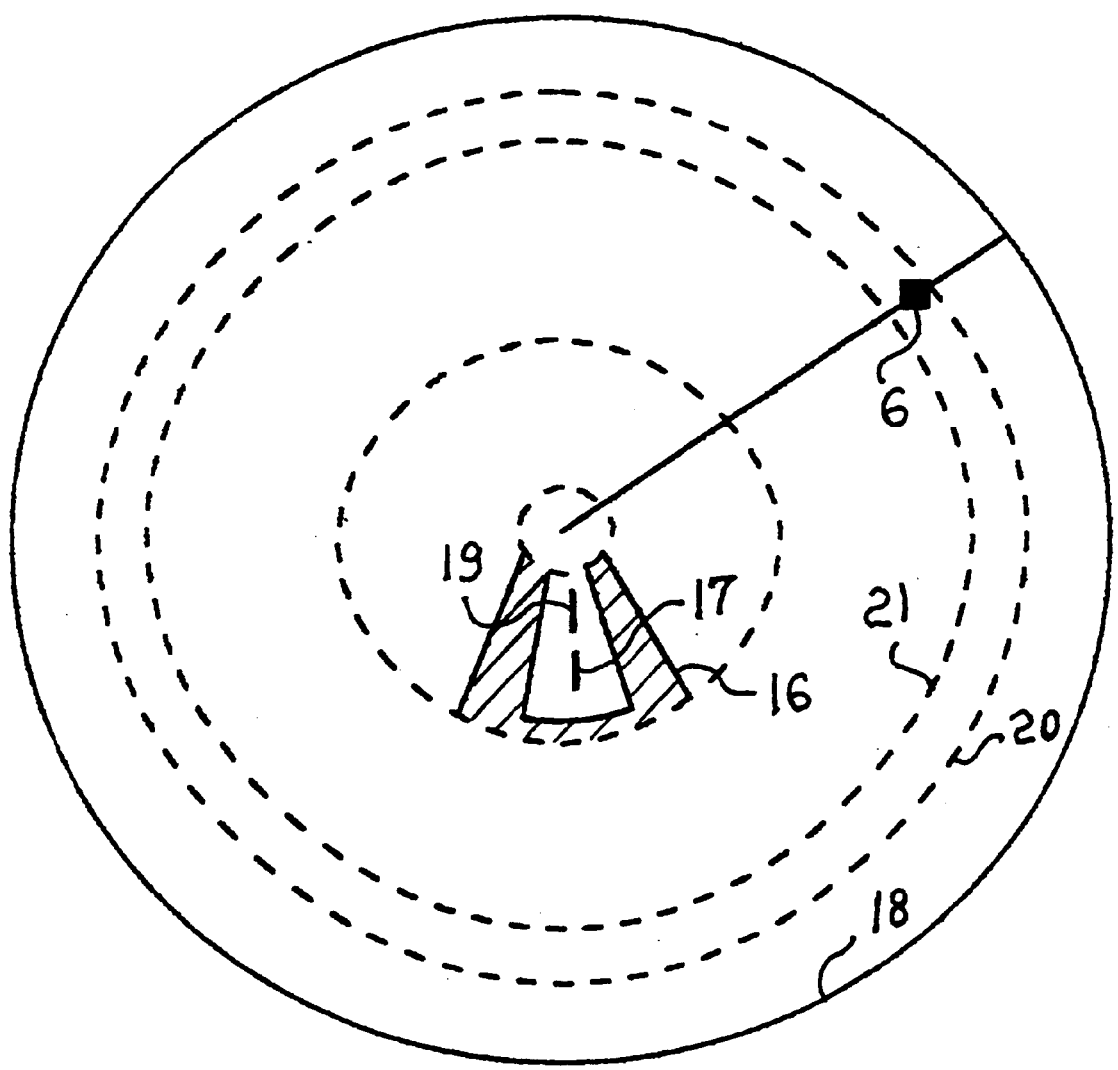
FIG. 1 is a simplified presentation of the collision warning target display system screen (a prior art).
Figure 2:
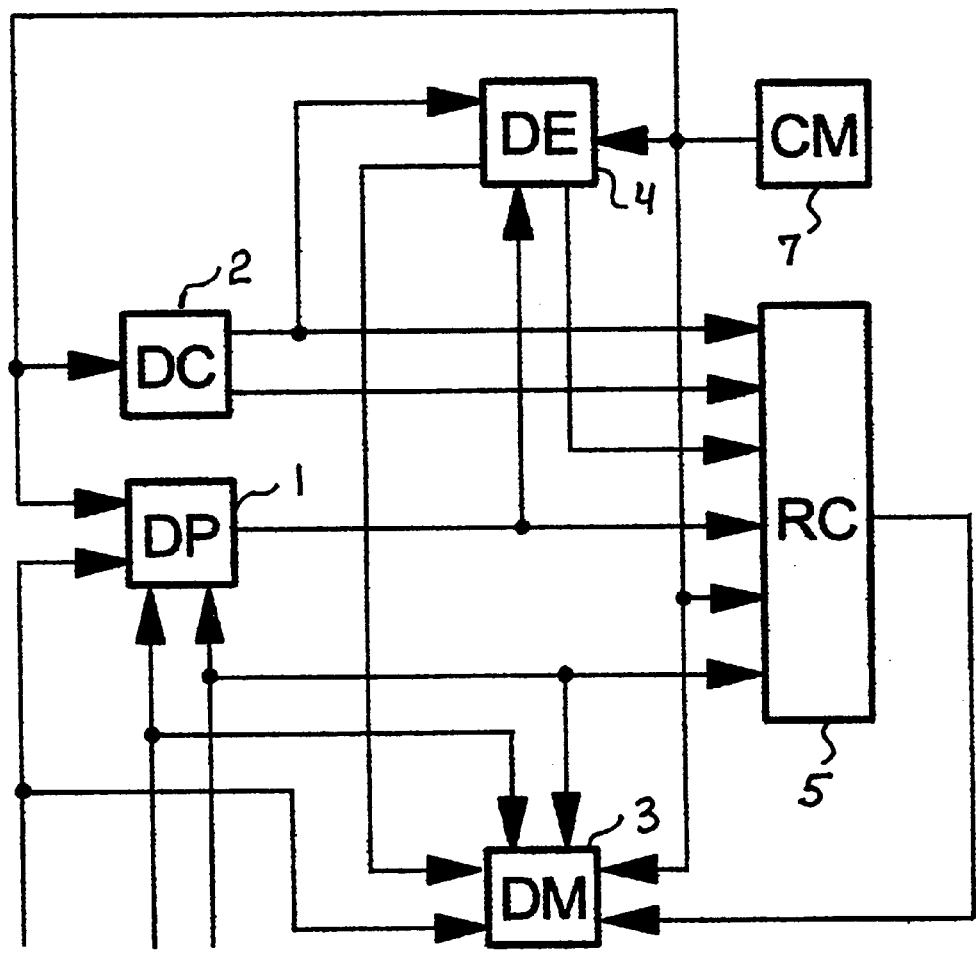
FIG. 2 is a structural schematic of the improved apparatus.

Referring to FIG. 2, an improved apparatus includes an initial data processing means 1 (DP), output of which is connected to the first input of the object disposition evaluation means 4 (DE), the second input of which is connected the first output of the dangerous criteria setting means 2 (DC). The first output of the object disposition evaluation means 4 is connected to the first input of the displaying means 3 (DM). The first input of the initial data processing means 1 is connected to the outputs of the vessel course sensor and of the vessel speed sensor (both sensors are not shown) and the second input of the initial data processing means 1 is connected to the first output of the vessel radar means (not shown). Another output of the vessel radar means is connected to the fourth input of the initial data processing means 1 and to the sixth input of the displaying means 3, the fifth input of which is connected to the first input of the data processing means 1.

The first input of the dangerous relative course zone determination means 5 (RC) is connected to the output of the initial data processing means I and the second input of the dangerous relative course zone determination means 5 is connected to the second output of the dangerous criteria setting means 2. The third input of the dangerous relative course zone determination means 5 is connected to the second input of the object disposition evaluation means 4 and the fourth input of the dangerous relative course zone determination means 5 is connected to the second input of the displaying means 3 and to the second input of the initial data processing means 1. The second output of the object disposition evaluation means 4 is connected to the fifth input of the dangerous relative course zone determination means 5, output of which is connected to the third input of the displaying means 3. The output of the control means 7 (CM) is connected to sixth input of the dangerous relative course zone determination means 5, to the third input of the object disposition evaluation means 4, to the fourth input of the displaying means 3, to the third input of the to the initial data processing means 1 and to the input of the dangerous criteria setting means 2.

Figure 3:
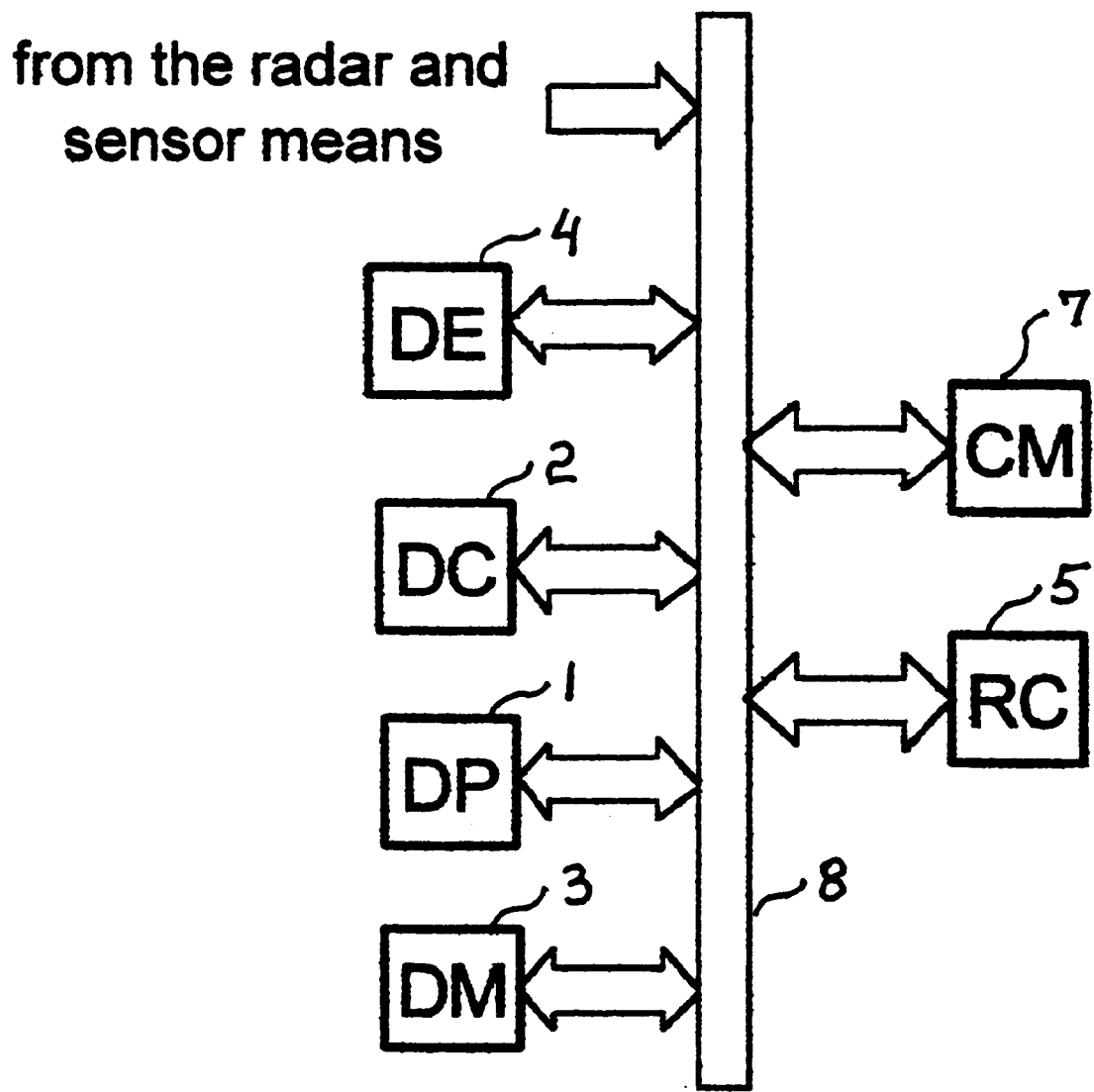
FIG. 3 is a structural schematic of the improved apparatus, comprising a multiplexed bus connection.

As shown on FIG. 3, all signal connections, mentioned above in the description of FIG. 2, can be provided by a multiplexed bus 8 or by a data bus and an address bus (both not shown).

Figure 4:
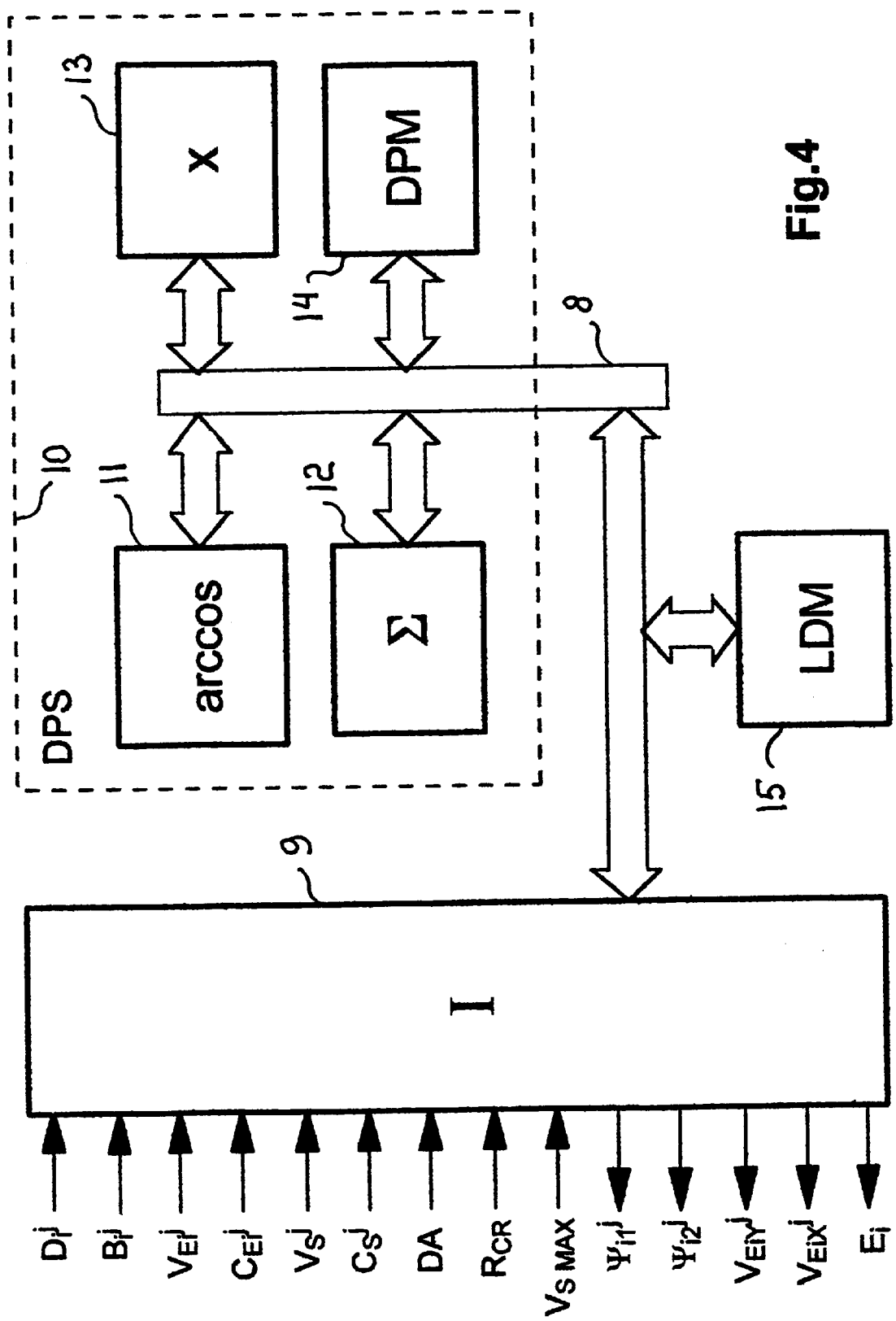
FIG. 4 is a block-diagram of the dangerous relative course zone determination means.

Referring to FIG. 4, the dangerous relative course zone determination means 5 comprises an interface-signal distribution means 9 (I) connected by a multiplexed bus 8 to a logic processing and distributing means 15 (LDM) and to a data processing system 10 (DPS), including a trigonometric function processing means 11 (TFM), a summarizing means 12 (E), a multiplying-dividing means 13 (X), a data processing means 14 (DPM) connected to each other by the same, mentioned above, multiplexed bus 8.

Figure 5:
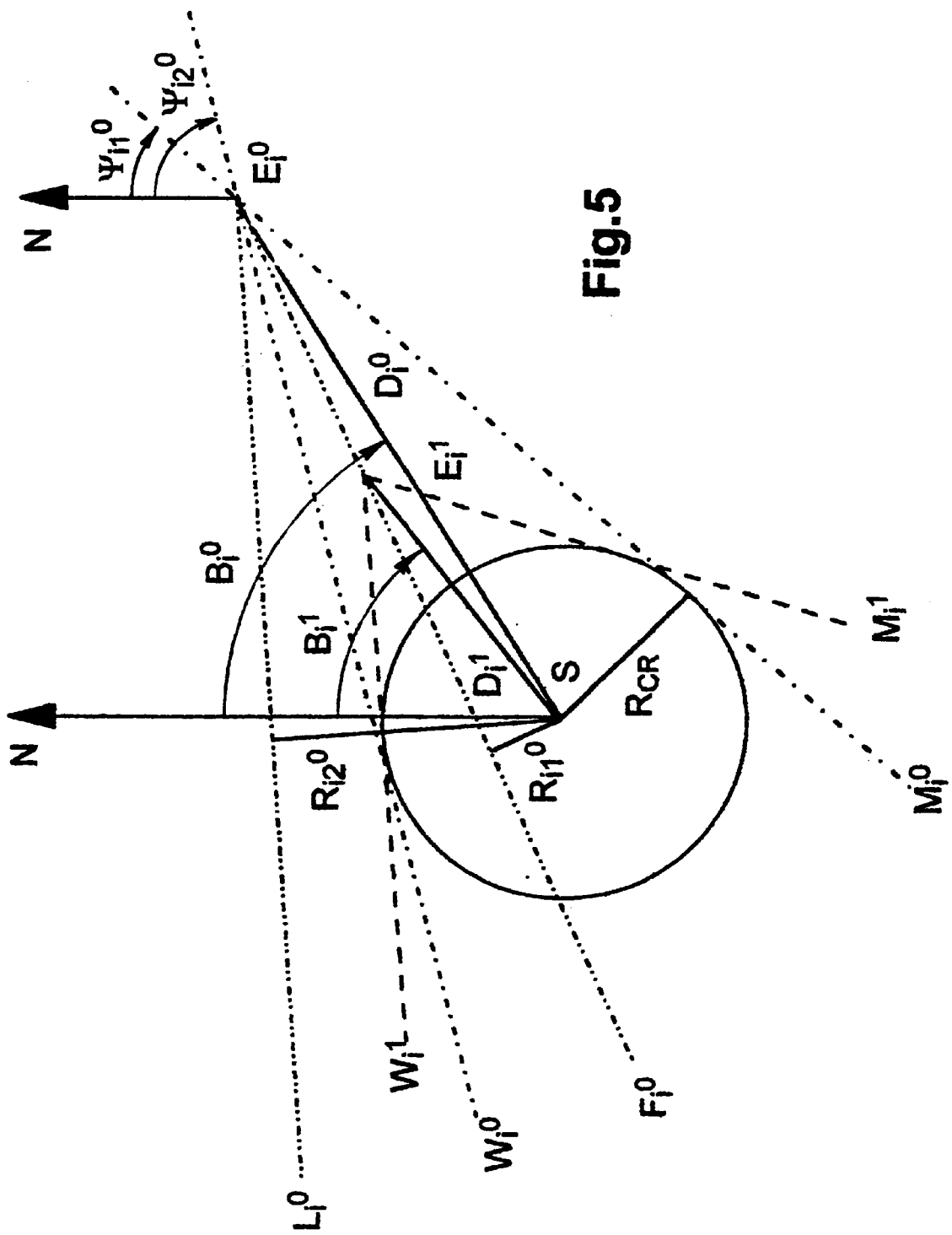
FIG. 5 is a graphical constructions, illustrating an improved method.

An improved method and apparatus operate as follows below. The initial data processing means 1 processes the signals following on its first input and containing the information about the own object S speed $V_S^j$ and course $C_S^j$ (where j=0, 1, 2, . . . , k, . . . ,1—an ordinal moment of the time, considering the discrete time process of the target object observation, for instance, once for 360° of the radar scanning) and the signals following on its second input and containing the information about the distances $D_i^j$ (where i=1, 2, 3, . . . , m, . . . ,n—an ordinal number of the target object) and bearing $B_i^j$ of each i-th target objects $E_i$. The synchronizing signals from the vessel radar means (not shown) follow to the forth input of the initial data processing means 1. The resulting signals, formed on the output of the initial data processing means 1, contain the information about elements of the target object movements: speed $V_{Ei}^j$ and course $C_{Ei}^j$ of each i-th target object $E_i$. The signals, which are proportional to the time of the anti-collision maneuver execution, are formed on the second output of the dangerous criteria setting means 2, on the first output of which are formed the signals, which are proportional to the minimal (critical) approach distance $R_{CR}$ between the own object S and target objects $E_i$, as it is shown on FIG. 5 (N on FIG. 5 represents the North). The object disposition evaluation means 4 on the base of the input information, contained in the input signals, evaluates the situation, e.g. determines the character of the target object $E_i$ movement with regard to the own object S (for example, receding, keeping position, approach); produces for the approaching target objects the signals containing information about direction and duration of the target object $E_i$ movement to the point of the critical distance $R_{CR}$; compares the signals containing information about current distance $D_i^j$ with the signal containing information about critical approach distance $R_{CR}$. Also, if $D_i^j \leq R_{CR}$, the object disposition evaluation means 4 produces the warning signal DA (dangerous approach: $D_i^j \leq R_{CR}$), following to the fifth input of the dangerous relative course zone determination means 5. The processed by the dangerous relative course zone determination means 5 warning signal DA follows to the third input of the displaying means 3 and to an alarm means (not shown), notifying the operator about the extraordinary situation.

The signals, containing information about distance $D_i^j$ and bearing $B_i^j$ of each i-th target object $E_i$ and about their speed $V_{Ei}^j$ and course $C_{Ei}^j$, follow from the output of the initial data processing means 1 to the first input of the dangerous relative course zone determination means 5, to the second input of which follows the signal containing information about the anti-collision maneuver execution duration. The signal containing information about critical approach distance $R_{CR}$ follows from the first output of the dangerous criteria setting means 2 to the third input of the dangerous relative course zone determination means 5. The signals containing information about $V_S^j$ and $C_S^j$ follow to the fourth input of the dangerous relative course zone determination means 5. If the warning signal DA on the fifth input of the dangerous relative course zone determination means 5 is missing, the dangerous relative course zone determination means 5 processes the current data and produces the signals, which are proportional to the angles $\Psi_{ig}^j$ (where g=1, 2, . . . , h, . . . , p—an ordinal number of the parameter), determining the direction of the lines, limiting (bordering) the zone $Z_i^j$ of the dangerous relative courses (lines PG and PK are for the initial object disposition, when j=0), as shown on FIGS. 5, 6.

For the surface anti-collision object maneuvering (ship maneuvering), as shown on FIGS. 4–7, is used the plane relative coordinate system $D_i^j B_i^j$ (the rectangular $X_i^j Y_i^j$ coordinate system can be used too) and the parameter $\Psi_{ig}^j$ is presented by $\Psi_{i1}^j$ and $\Psi_{i2}^j$ (g=1; 2), but for the spatial anti-collision object maneuvering (submarine, airplane, missile maneuvering) is used the rectangular $X_i^j Y_i^j Z_i^j$ coordinate system or relative coordinate system $D_i^j B_i^j H_i^j$, where $H_i^j$—an angle of the height (an altitude) of the i-th target object at the j-th moment of the time, and the parameter $\Psi_{ig}^j$ is presented by $\Psi_{i1}^j$, $\Psi_{i2}^j$, $\Psi_{i3}^j$, $\Psi_{i4}^j$ (g=1; 2; 3; 4), related to the spatial dangerous relative course zones into the spatial geometric figure, which will be described hereinafter.

For the surface anti-collision object maneuvering the parameter $\Psi_{ig}^j$ can be determined, for example, by the following equations:

$$\Psi_{i1}^j = (B_i^j - \pi/2) + \arccos(R_{CR}/D_i^j), \quad [1]$$

$$\Psi_{i2}^j = (B_i^j + \pi/2) - \arccos(R_{CR}/D_i^j), \quad [2]$$

where
  $D_i^j$—a distance between the own object S and the i-th target object $E_i^j$;
  $B_i^j$—a bearing of the i-th target object $E_i^j$;
  $R_{CR}$—a minimal (critical) approach distance between the own object S and the i-th target object $E_i^j$.

On FIGS. 4, 5 are shown the angles $\Psi_{i1}^0$ and $\Psi_{i2}^0$, characterizing the direction of lines $E_i^0 M_i^0$ and $E_i^0 W_i^0$ respectively (j=0 for the initial object position). These lines border the dangerous relative course zone $Z_i^0$. The trigonometrical function arccos for $\Psi_{i1}^j$ and $\Psi_{i2}^j$ calculation in the equations [1] and [2] can be presented by any other trigonometrical function (arcsin, arctan, arcctn, etc.), transformed from the trigonometrical function arccos.

Figure 11:
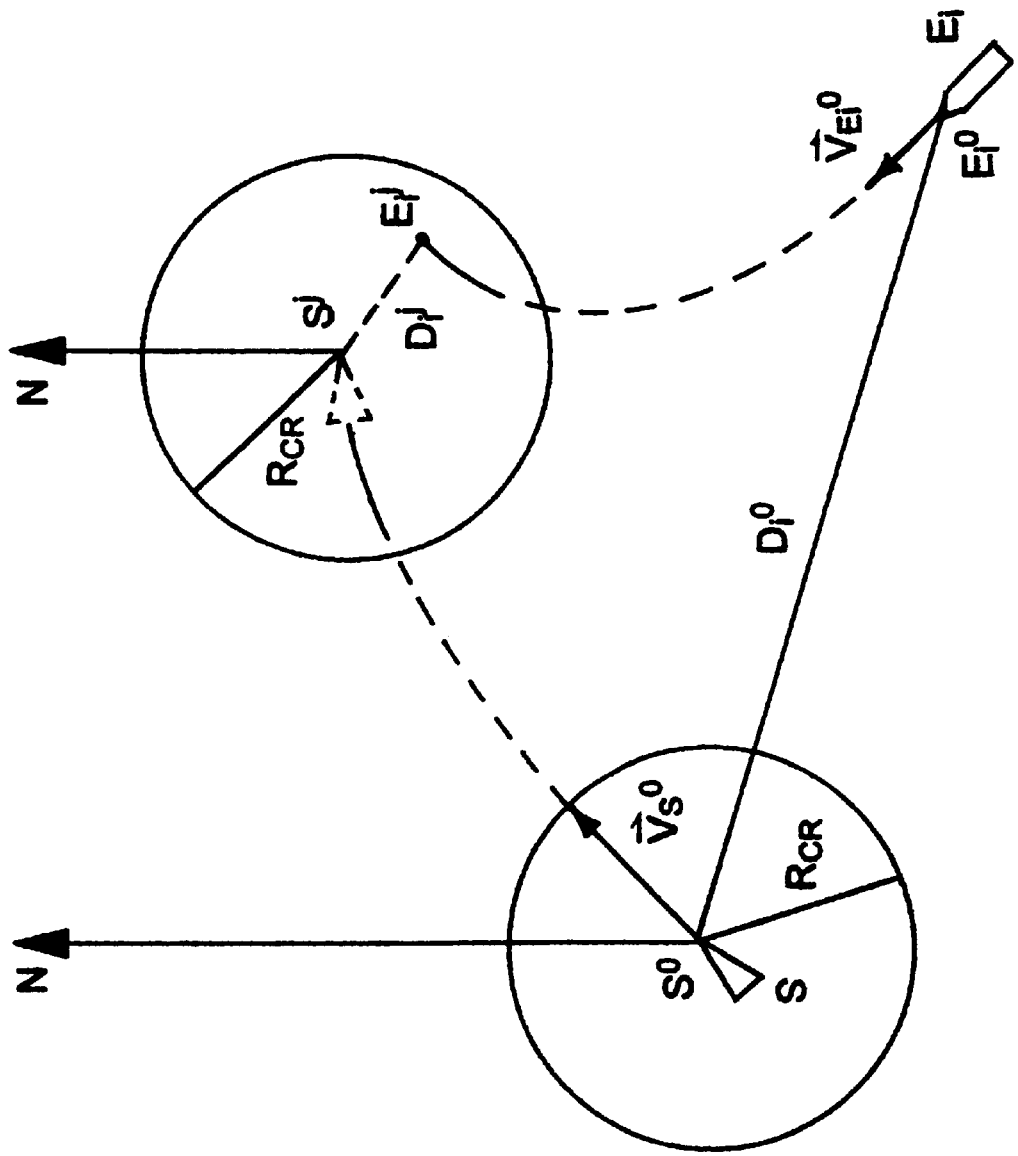
FIG. 11 is a simplified graphical illustration of the interception tactic maneuvering.

Referring to FIG. 5, illustrating the improved method, the i-th target object $E_i^j$ is initially (j=0; $E_i^j \equiv E_i^0$) positioned of the bearing $B_i^0$ and distance $D_i^0$ with regard to the own object S and is moved with the speed-vector $\vec{V}_{Ei}^j$. The own object is positioned in the center of the circle with radius $R_{CR}$. The circle with the radius $R_{CR}$ corresponds to the still non-dangerous minimal approach distance between the own object S and target object $E_i^0$ to provide the object collision avoidance (also the inside area of the circle with the radius $R_{CR}$, as shown on FIG. 11, corresponds to the area of "the target object interception" to provide the successful execution of the assigned tactic maneuvering, for example, interception, as to be described hereinafter). The angle $M_i^0 E_i^0 W_i^0$ with the vertex at the point $E_i^0$, corresponding to the i-th target object position (on FIGS. 5, 6 this vertex corresponds to the initial i-th target object position), is formed by the tangent lines $E_i^0 M_i^0$ and $E_i^0 W_i^0$ to the circle with radius $R_{CR}$. In compliance with an improved method referred to the collision preventive maneuvering, the speed-vector $\vec{V}_S^j$ of the own object S has to have the value and direction (see FIG. 7), providing the location of its end out of the zone $Z_i^0$, bordered by the lines PG and PK (see FIGS. 5, 6). The lines PG and PK are started from the point P, corresponding to the end of the speed-vector $\vec{V}_{Ei}^0$ of the target object $E_i^0$, as shown on FIG. 6.

Figure 6:
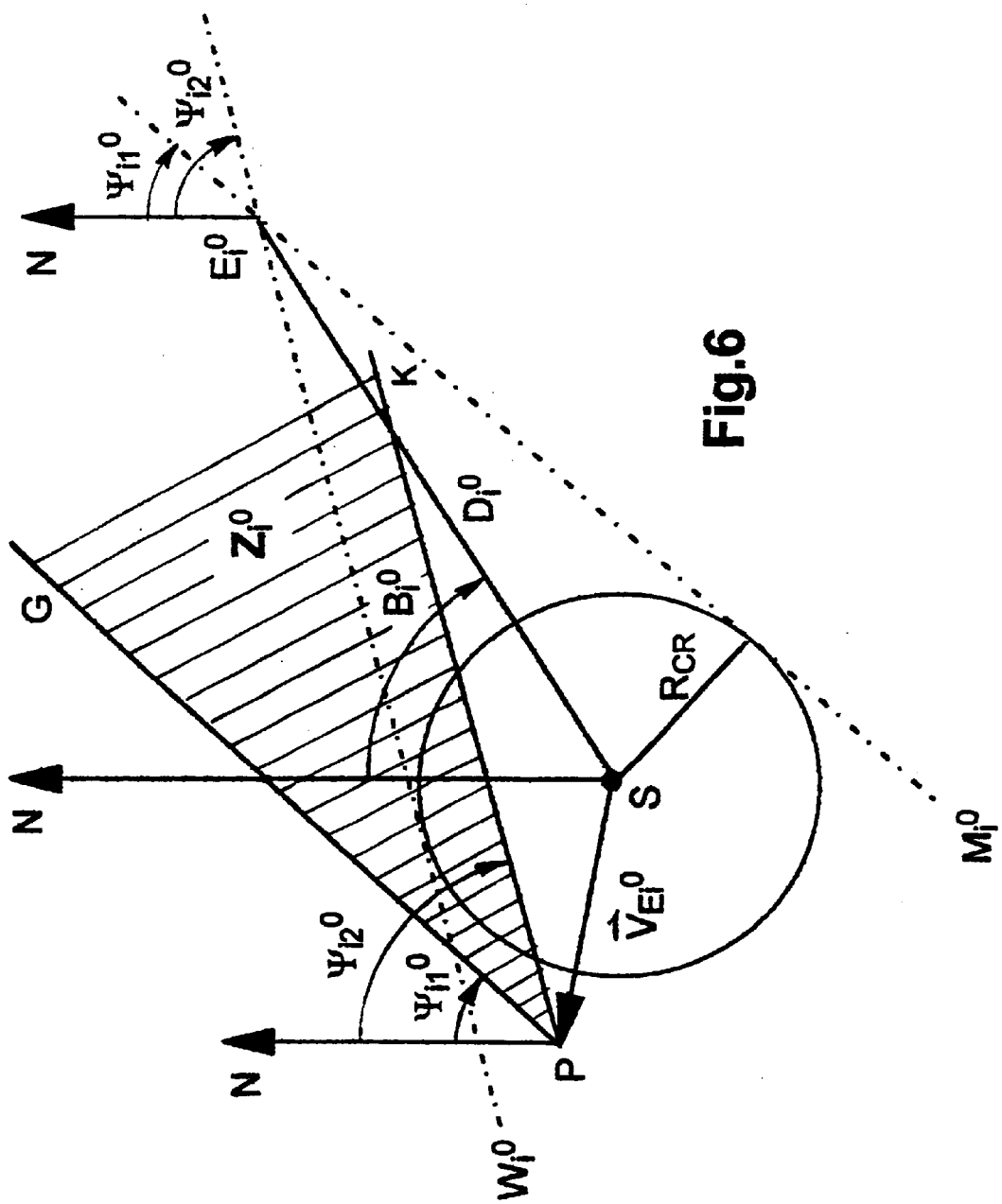
FIG. 6 is a simplified illustration of the dangerous relative course zone graphical constructing.
Figure 7:
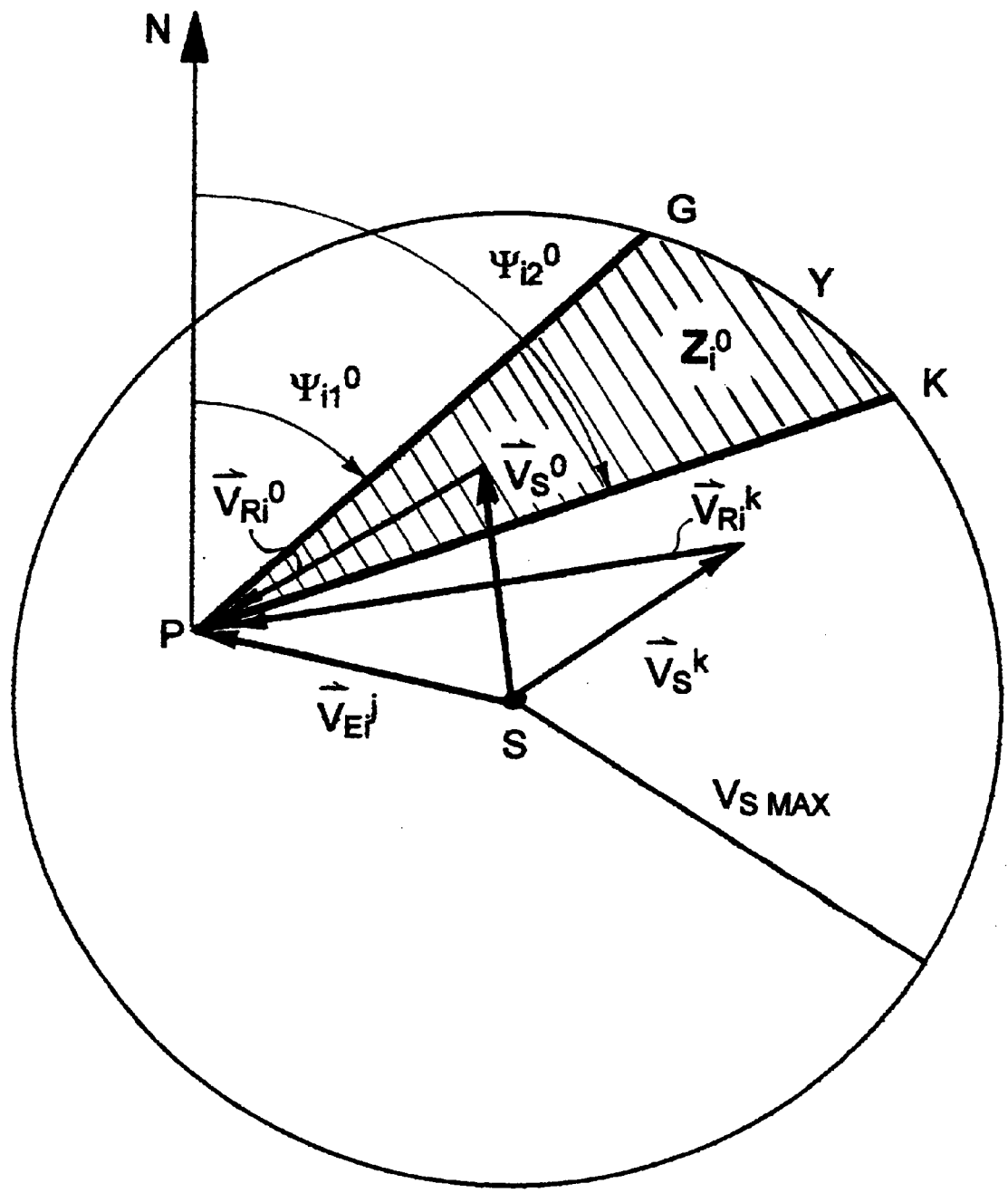
FIG. 7 is a simplified illustration of the vessel anti-collision maneuver (speed-vector) selection process.

Referring to FIG. 7, the sum of the speed-vector $\vec{V}_{Ei}^0$ (j=0 for initial object position) of the i-th target object $E_i$ and the speed-vector $\vec{V}_S^0$ of the own object S creates the relative speed-vector $\vec{V}_{Ri}^0$, which leads to the dangerous approach distance $R_{i1}^0$ ($R_{i1}^0 \perp E_i^0 F_i^0$) between the target object $E_i$ and the own object S (supposedly the collision might be occurred). If operator chooses the speed-vector $\vec{V}_S^k$ (e.g., assume for convenience, that the speed $V_{Ei}^j$ and the course $C_{Ei}^j$ of the i-th target object $E_i$ are not changed /$V_{Ei}^j = V_{Ei}^0$; $C_{Ei}^j = C_{Ei}^0$/ during the period of time, that is necessary for the operator to choose the anti-collision maneuver), which in the sum with the speed-vector $\vec{V}_{Ei}^j$ creates the relative speed-vector $\vec{V}_{Ri}^k$. As shown on FIGS. 4–6, the relative speed-vector $\vec{V}_{Ri}^k$ provides non-dangerous object passage each other at the distance $R_{i2}^0$ ($R_{i2}^0 \perp E_i^0 L_i^0$).

Figure 10:
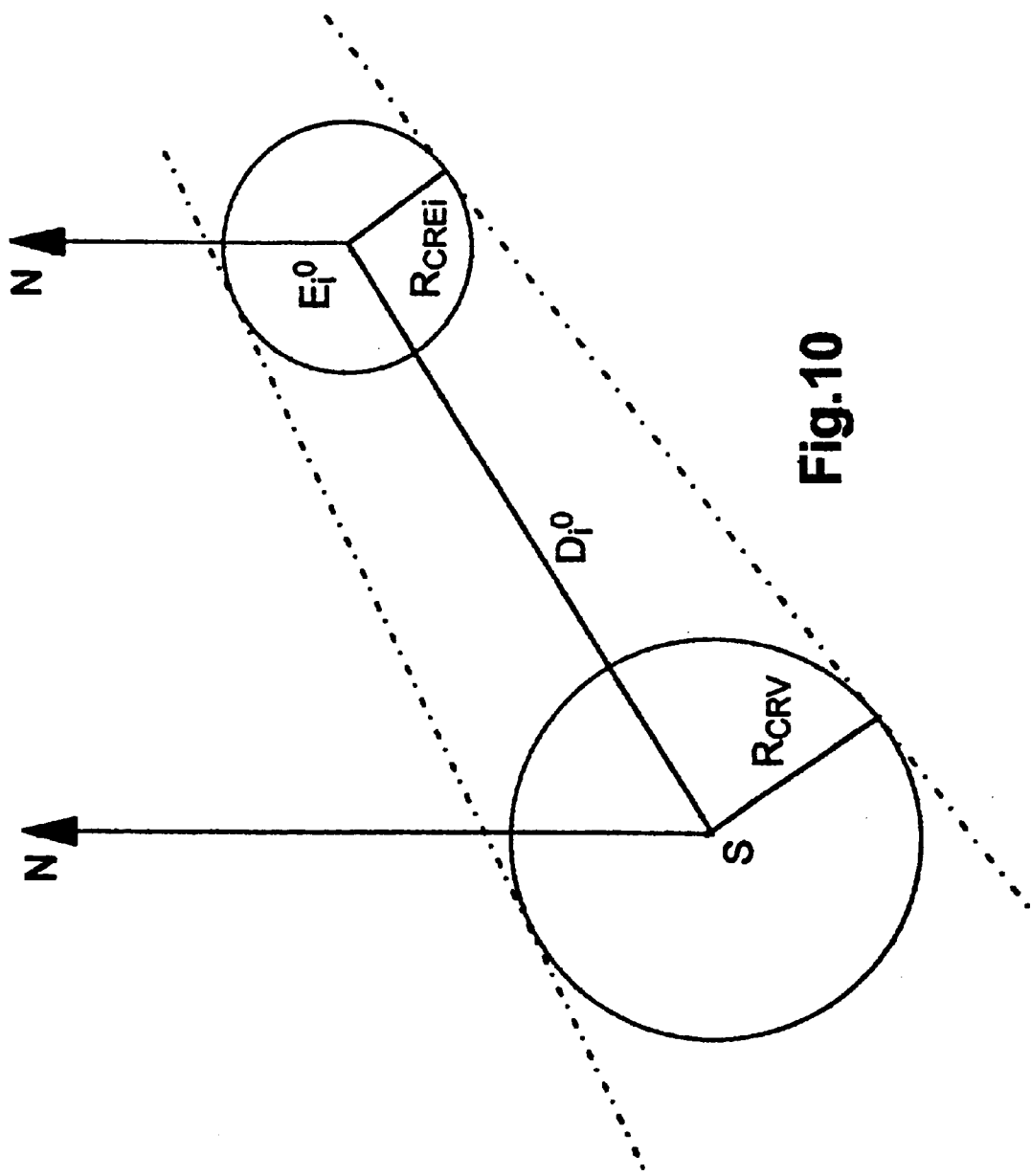
FIG. 10 is a simplified illustration of the dangerous relative course zone graphical construction variation.

Thus, in the compliance with an improved method referred to collision avoidance, the zone of the own object (vessel) speed-vector $\vec{V}_S^j$ values, providing the non-dangerous object passage each other at the distance not less than the minimal (critical) distance $R_{CR}$, is limited by the maximal value of the speed $V_{S\,MAX}$ and the lines, bordering the zone of the dangerous relative courses. As mentioned above, the angles $\Psi_{i1}^j$ and $\Psi_{i2}^j$, determining by the equations [1] and [2], characterize the directions of such lines. Referring to FIG. 7, the dangerous for the vessel speed-vector $\vec{V}_S^j$ value zone $Z_i^o$ (the hatched part of FIG. 7). characterizing the possible dangerous object passage each other at the distance shorter than the minimal approach distance $R_{CR}$, is limited by an arc $\overparen{GYK}$ and by the lines PG ($PG|E_i^oM_i^o$ see FIG. 6) and PK ($PK|E_i^oW_i^o$), bordering the dangerous relative courses zone $Z_i^o$. There is also possible, for example, the consideration and setting of the approximate minimal approach distance $R_{CR}$, statistically constant and/or tabular value of $R_{CR}$ (considering the different modifications of the known class target objects), maximal value of $R_{CR}$ applied to all target objects, and/or separate consideration and setting of the vessel critical approach distance $R_{CRV}$ and the critical approach distance $R_{CREi}$ of the appropriate current target object, as shown on FIG. 10.

The displaying means 3 includes a relative situation indicator (not shown), representing the relative dislocation of the objects ($D_i^j B_i^j$ coordinate system), when the own object S is in the center of the screen, and can include the real situation indicator (not shown), providing representation of the real (non-relative) disposition of the objects (rectangular $X_i^j Y_i^j$ coordinate system) in compliance, for instance, with the map. The relative situation indicator of the displaying means 3 can have two modes: the first mode provides the displaying of the information presented in the alphabet-number tabular style (not shown), by which on the screen are presented, for example, the ordinal number $E^i$ of each target object, the current coordinates $D_i^j B_i^j$ (position) of the each i-th target object $E_i$, the values of the speed $V_{Ei}^j$ and course $C_{Ei}^j$ of the each i-th target object $E_i$, the time of the mutual approach, the character of the movement (receding, keeping position, approach), the degree of the danger (non-danger mutual movement, the preventive anti-collision maneuvering is required, the extraordinary anti-collision maneuver is required) and also can be presented, for example, the extrapolated coordinates $D_i^{j+1} B_i^{j+1}$ (position) of the each i-th target object $E_i$. The second mode provides the displaying of the dangerous relative course zones $Z_i^j$ for the each i-th target object $E_i$ with the target object number $E_i$ respectively (the target object marks, speed-vectors $\vec{V}_{Ei}^j$ and $\vec{V}_S^j$ can also be displayed—not shown). Thus, both modes provide a maximal informativeness for the operator.

The real situation indicator can provide, for example, the representation of the own object movement trajectory, fairway and other characteristics of the navigation environment.

Figure 8:
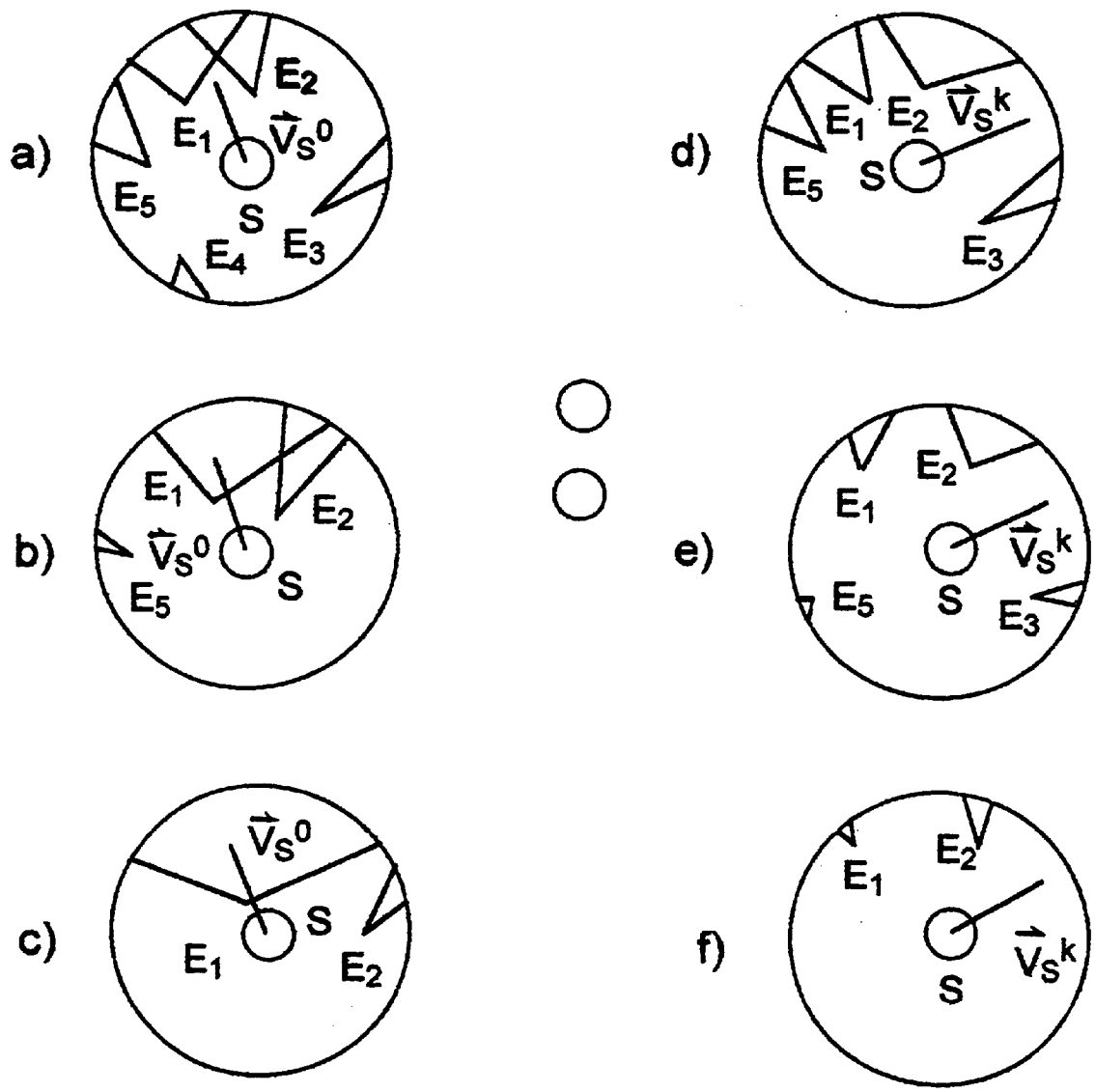
FIG. 8 is a simplified illustration of the vessel collision avoidance dynamic process on the relative situation indicator screen.

On FIG. 8 is simply shown a dynamical process of the graphical information representation example on the simplified relative situation indicator screen. FIGS. 8a–8c represent the dangerous relative course zones and their "behavior" on the relative situation indicator screen in dynamics, i.e. the time-varying screen-information presentation. If the speed-vector $\vec{V}_S^j$ of the vessel S and the speed-vector $\vec{V}_{Ei}^j$ of the target objects $E_1$–$E_5$ are not changed (are an invariable) during mutual movement, the operator can see that the dangerous relative course zone of the first target object $E_1$ (i=1) is dangerously approached (a collision can possibly be occurred) and the dangerous relative course zones for the target objects $E_2$–$E_5$ are "running away" of the relative situation indicator screen, showing the non-dangerous mutual movement of the own object S and target objects $E_2$–$E_5$ respectively. FIGS. 8d–8f represent the situation, when the operator changes the speed-vector $\vec{V}_S^j$ of the own object S (changes the course $C_S^j$ /the direction of the speed-vector $\vec{V}_S^j/$ and increases, for instance, the value of the speed $V_S^j$), extrapolating (foreseeing) the avoidance of the possible dangerous target objects $E_1$ and/or $E_2$ approach. In this case, the dangerous relative course zones for all target objects $E_1$–$E_5$ are "running away" of the relative situation indicator screen, representing the object non-dangerous mutual movement for the chosen maneuver, providing collision avoidance maneuvering.

Figure 9:
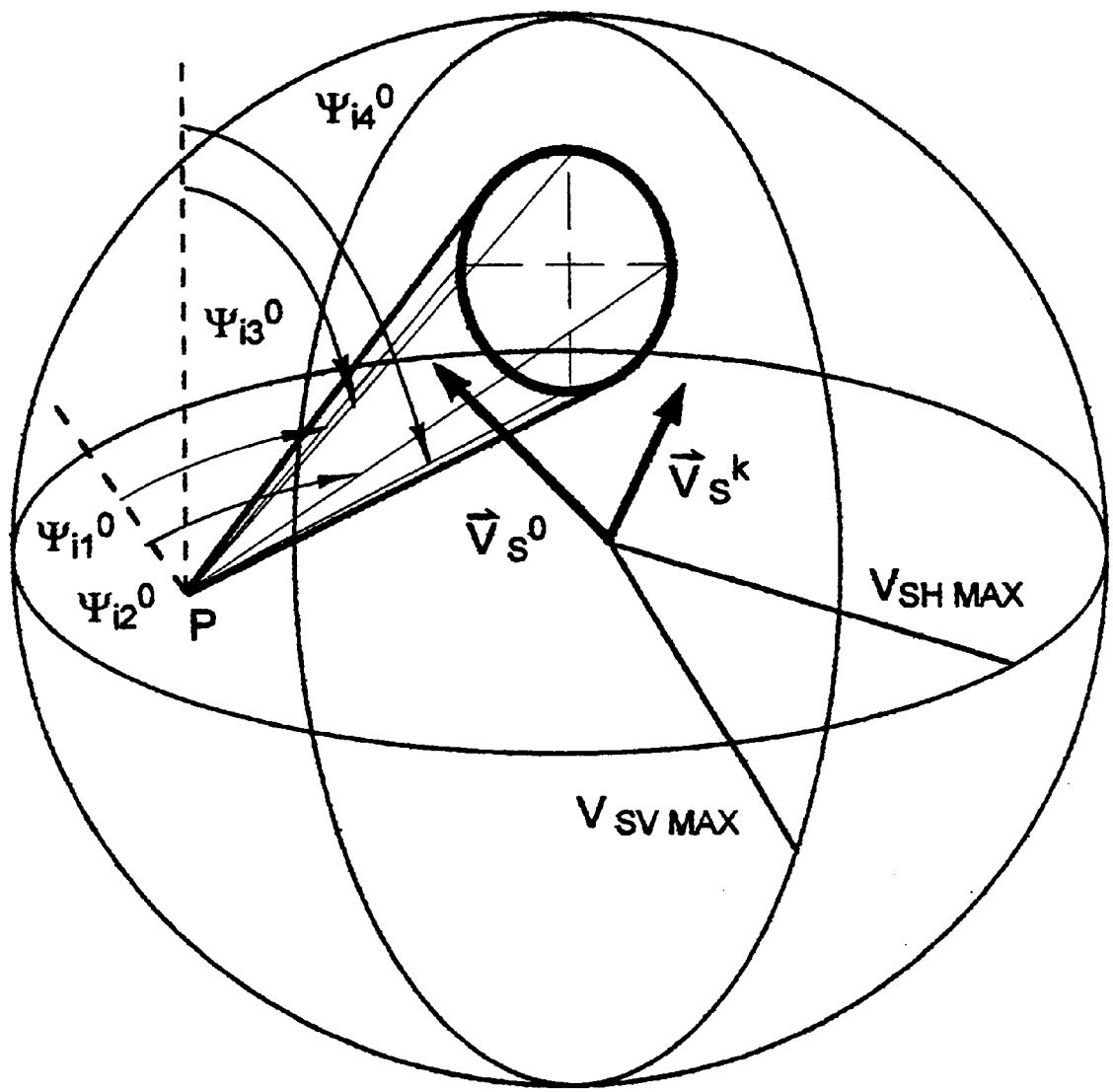
FIG. 9 is a simplified illustration of the spatial dangerous relative course zones.

FIG. 9 represents the simplified graphical illustration of the vessel collision avoidance for the objects, the elements of the movement of which are described by a relative coordinate system $D_i^j B_i^j H_i^j$ (or by a rectangular $X_i^j Y_i^j Z_i^j$ coordinate system, which is not shown), as was mentioned hereinbefore. For example, if $V_{SH\,MAX} = V_{SV\,MAX}$ (where $V_{SH\,MAX}$—a vessel maximal horizontal speed; $V_{SV\,MAX}$—a vessel maximal approximate vertical speed), then the spatial dangerous relative course zone is a cone of revolution with the spherical base (the sector of the sphere, having, for example, the approximate radius $V_{S\,MAX} = V_{SH\,MAX} = V_{SV\,MAX}$) and a vertex at the point of the i-th target object speed-vector $\vec{V}_{Ei}^j$ end. The cross-section of the cone base can have the configuration of the circle with the radius, proportional to $\Psi_{ig}^j$ ($\Psi_{i1}^j = \Psi_{i2}^j = \Psi_{i3}^j = \Psi_{i4}^j$), or, for example, the configuration of the ellipse with the axes, proportional to $2\Psi_{i3}^j$ ($\Psi_{i3}^j = \Psi_{i4}^j$) and to $2\Psi_{i1}^j$ ($\Psi_{i1}^j = \Psi_{i2}^j$), if, to assume, that $V_{SH\,MAX} \ne V_{SV\,MAX}$. If the maximal vertical speed $V_{SV\,MAX}$ is non-approximate parameter (for instance, $V_{SV/U\,MAX} \ne V_{SV/D\,MAX}$, where $V_{SV/U\,MAX}$—a vessel maximal vertical speed up /speed of climb/; $V_{SV/D\,MAX}$—a vessel maximal vertical speed down /speed of descent/), the cross-section of the cone base has more complex configuration, which can be calculated too.

The transformation from $D_i^j B_i^j H_i^j$ coordinate system to rectangular coordinates $X_i^j Y_i^j Z_i^j$ or from rectangular coordinate system $X_i^j Y_i^j Z_i^j$ to polar (relative) coordinates $D_i^j B_i^j H_i^j$ can be provided, for example, by the following equations:

$$\left. \begin{aligned} X_i^j &= D_i^j \times \sin(H_i^j) \times \cos(B_i^j); \\ Y_i^j &= D_i^j \times \sin(H_i^j) \times \sin(B_i^j); \\ Z_i^j &= D_i^j \times \cos(H_i^j) \end{aligned} \right\} \text{and} \quad [3]$$

$$\left. \begin{aligned} D_i^j &= \sqrt{[X_i^j]^2 + [Y_i^j]^2 + [Z_i^j]^2} \; ; \\ B_i^j &= \arctan(Y_i^j / X_i^j); \\ H_i^j &= \arccos\left(Z_i^j / \sqrt{[X_i^j]^2 + [Y_i^j]^2 + [Z_i^j]^2}\right) \end{aligned} \right\}.$$

The dangerous relative course zones are determined by a dangerous relative course zone determination means 5 (see FIG. 4), wherein the input signals, containing information about $V_S^j$ and $C_S^j$, are transformed in the data processing means 14 to the signals, containing information about rectangular coordinates $V_{SX}^j$, $V_{SY}^j$ of the vessel speed-vector $\vec{V}_S^j$. The signals, containing the information about $D_i^j$, $B_i^j$, $V_{Ei}^j$, $C_{Ei}^j$ of the each i-th target object $E_i$, follow from the initial data processing means 1 to the interface-signal distribution means 9, which provides the distribution (commutation) these signals for further processing. Such distribution is provided in the danger criteria target object sequence (in the rank of the target object danger). Also the interface-signal distribution means 9 provides the conventional numbering of the target objects and the data processing and information displaying is accompanied by an appropriate target object conferred number. The signals, following from the output of the interface-signal distribution means 9 and containing information about $V_{Ei}^j$, $C_{Ei}^j$, are transformed in the data processing means 14 to the signals containing information about rectangular coordinates $V_{EiX}^j$, $V_{EiY}^j$ of the speed-vector $\vec{V}_{Ei}^j$ of each i-th target object $E_i$. These signals from the data processing means 14 follow through the interface-signal distribution means 9 to the output of the dangerous relative course zone determination means 5. The warning signal DA follows from the output of the object disposition evaluation means 4 through the interface-signal distribution means 9 to the input of the logic processing and signal distribution means 15. The dangerous relative course zone determination means 5 can provide two modes of the operation: when the signal DA is missing and the second mode, when the signal DA is presented.

For the first mode, the determination of the borders (lines PG, PK under angles $\Psi_{i1}^j$, $\Psi_{i2}^j$ of the North, as shown on FIGS. 5, 6) of the dangerous relative course zones $Z_i^j$ can be provided by the consideration of the current positions of the target objects and the dangerous relative course zone determination means 5 processes at the j-th moment of the time the signals, containing information about current $D_i^j$, $B_i^j$. If the signal DA is presented, the dangerous relative course zone determination means 5 extrapolates the situation on the (j+1)-th moment of the time.

For example, if the own object S and the i-th target object $E_i$ mutual approach is not dangerous (signal DA is not presented), the dangerous relative course zone determination means 5 processes at the j-th moment of time the really presented current parameters $D_i^j$, $B_i^j$, but if the signal DA is presented, the dangerous relative course zone determination means 5 processes at the j-th moment of time the extrapolated on the j+1) moment of time parameters $D_i^{j+1}$, $B_i^{j+1}$. The j+1)-th moment of time is adequate to the moment of the time, on which the anti-collision maneuvering is completed (period of time $t^{j+1}-t^j$ is an anti-collision maneuver execution time). The trigonometric function processing means 11 together with the summarizing means 12 and multiplying-dividing means 13 provides the determination of the parameters $\Psi_{ig}^j$, and the data processing means 14 together with the summarizing means 12, multiplying-dividing means 13 and the logic processing and signal distribution means 15 provides the object disposition extrapolation.

The dangerous relative course zone determination means 5 operates as follows. If the signal DA is not presented, the logic processing and signal distribution means 15 produces an appropriate signal allowing to process the signals, containing information about current $D_i^j$, $B_i^j$. The signal, containing information about $D_i^j$ also follows to the multiplying-dividing means 13, wherein also follows the signal, containing information about $R_{CR}$. The multiplying-dividing means 13 transforms the signals, containing information about $D_i^j$ and $R_{CR}$ to the signal, proportional to the value of $R_{CR}/D_i^j$. Further this signal follows to the trigonometric function processing means 11, which produce on its output the signal, proportional to the value of arccos($R_{CR}/D_i^j$). This signal follows to the summarizing means 12, in which also follows the signal, containing information about $B_i^j$ (the parameter π, as a constant, is stored in the memory). As a result, on the summarizing means 12 output are formed the signals proportional to $\Psi_{i1}^j$, $\Psi_{i2}^j$.

If the signal DA is presented, as was mentioned above, the logic processing and signal distribution means 15 produces an appropriate signal not allowing to process the signals, containing information about current $D_i^j$, $B_i^j$ and forms the signal allowing the extrapolation process.

In this case, the signals, containing information about speed-vector $\vec{V}_s^j$ of the own object S and about speed-vector $\vec{V}_{Ei}^j$ of each i-th target objects $E_i$, follow from the data processing means 14 through the logic processing and signal distribution means 15 to the summarizing means 12, which produces the signals, proportional to the rectangular coordinates $V_{RiX}^j$, $V_{RiY}^j$ of the relative speed-vector $\vec{V}_{Ri}^j$. These signals follow to the multiplying-dividing means 13, in which also from the dangerous criteria setting means 2 through the logic processing and signal distribution means 15 follows the signal, proportional to the anti-collision maneuver execution time. As a result, on the output of the multiplying-dividing means 13 is formed signals, proportional to the rectangular coordinates of the distance, which the i-th target object passes for the anti-collision maneuvering execution time. The summarizing means 12 summarizes these signals with the signals, following from the data processing means 14 and containing information about the rectangular current coordinates of the i-th target object current position, and forms on its output the signals, proportional to the rectangular coordinates of the i-th target object extrapolated position on the moment of time, when the extrapolating anti-collision maneuver is completed. These signals follow to the input of the data processing means 14, which transforms them to the signals, containing information about $D_i^{j+1}$, $B_i^{j+1}$ of the i-th target object extrapolated position on the moment of time (j+1), adequate, as was mentioned above, to the moment of the extrapolating anti-collision maneuver completion time. Further, these signals through the logic processing and signal distribution means 15 follow to the summarizing means 12, which forms the signals, containing information about the borders $\Psi_{i1}^{j+1}$, $\Psi_{i2}^{j+1}$ of the extrapolated dangerous relative courses zone. These signals through the data processing means 14 and interface-signal distribution means 9 follow to the relative situation indicator (not shown) of the displaying means 3 and, for example, the signals, containing information about rectangular characteristics of the objects and extrapolated dangerous relative courses zone, can follow to the real situation indicator (not shown) of the displaying means 3.

The relative situation indicator (and/or the real situation indicator) indicates the dangerous relative course zones, speed-vector $\vec{V}_s^j$, the ordinal numbers $E_i$ of the target objects and also on the relative situation indicator screen (and/or on the real situation indicator screen) can be presented the object marks, minimal approach distance circle $R_{CR}$ and some special tactic restricted zones and/or directions, etc.

Thus, the interface-distribution mean 9, the data processing system 10 and the logic processing and signal distribution means 15 of the dangerous relative course zone determination means 5 provide the realization of the mentioned above two modes.

The control of an improved apparatus is provided by the control means 7. The vessel maneuvering control can be provided by the operator at the hand-operated mode and/or at the automated or automatic mode.

The vessel data processing cycles consider, for example, the object circulation factors, maneuver precision evaluation and correction, providing by the data processing system 10. The anti-collision maneuvering simulation can also be provided at the "reverse" collision avoidance maneuvering coordinate system, for example, at $D_i^j/B_i^j$ of the own object coordinate system (as if a simulation is provided by the own object operator for the target object operator) and can be displayed to the own object operator, for instance, on an additional indicator.

The above description has been given at the determinate definition of the processes of the maneuvering (collision avoidance), provided by an improved method and realized by an improved apparatus. Such maneuvering is a non-antagonistic strategy (criteria, interest) maneuvering, but an improved method and an improved apparatus also provide a determinate, stochastic and mini-maxi and/or maxi-mini optimal criteria definition and the tactic maneuver determination and evaluation, for example, for the object pursuit-evasion and/or interception tactic maneuvering. An improved method and apparatus can successfully be used for any variety of the tactic meneuvering (e.g., the assigned distance position holdingis, assign bearing position holding, etc.). The stochastic optimal criteria tactic maneuvering is a vessel maneuvering with regard to the non-extrapolating moving target object (for example, to a strayed uncontrollable moving target object). The object pursuit-evasion and/or interception tactic maneuvering in compliance with the determinate definition or mini-maxi and/or maxi-mini optimal criteria definition is an antagonistic strategy maneuvering of at least two maneuvering objects: an own object S and, for example, target object $E_i$ (i=1). For these types of the maneuvering, the signals, containing information about $V_S^j$, $C_S^j$ and $V_{Ei}^j$, $C_{Ei}^j$, are renewed and processed in the initial data processing means 1 periodically too, but more often (e.g., each radar observation cycle), considering the tactic purpose and in compliance with the tactic situation and circumstances. The data processing means 14 of the data processing system 10 together with the summarizing means 12, multiplying-dividing means 13 and logic and signal distributing means 15 processes the signals, following from the dangerous criteria setting means 2 and containing information about determinate, probabilistic (stochastic) or the mini-maxi and/or maxi-mini optimal strategy criteria, and forms the signals, containing the same information about the dangerous relative course zone, as was mentioned above, and information about the determinate maneuver (speed-vector $\vec{V}_S^j$) on the current j-th moment of time or an optimal maneuver (speed-vector $\vec{V}_S$), considering the target object stochastic movement or an antagonistic interest of the maneuvering objects respectively. For the vessel mini-maxi and/or maxi-mini criteria pursuit and/or interception optimal maneuvering, the end of speed-vector $\vec{V}_S$ has to be into the dangerous relative course zone and for the mini-maxi and/or maxi-mini criteria evasion optimal maneuvering, the end of speed-vector $\vec{V}_S$ should not to be into the dangerous relative course zone. The speed-vector $\vec{V}_S$ optimizing processes, providing by an improved method and an improved apparatus, are the vessel speed $V_S$ and course $C_S$ optimization in compliance with the selected (setting) mini-maxi or maxi-mini criteria. The final value of the vessel speed-vector $\vec{V}_S$ can be not identical with the vessel speed-vector initial value $\vec{V}_S^0$:

$$V_S \begin{vmatrix} \leq V_S^0 \\ > V_S^0, \\ 0 < V_S^0 < V_{SMAX} \end{vmatrix} \quad [4]$$

The formed and processed signals follow from the data processing system 10 of the dangerous relative course zone determination means 5, for example, to the relative situation indicator (not shown on FIGS. 1–4) of the displaying means 3 for an operator evaluation.

CONCLUSION, RAMIFICATIONS AND SCOPE

Accordingly the reader will see that, according to the invention, I have provided a method and apparatus for control of the vessel maneuvering, which provide a visual evaluation of the pursuit-evasion (and/or interception) tactic maneuvering and/or collision danger approach and practically instantaneous (during 2–3 seconds) selection of the optimal anti-collision maneuvering by determining and displaying for operator the dangerous relative course zones, wherein the end of the vessel speed-vector should not be located for the evasion tactic maneuvering and/or collision avoidance maneuvering and should be located for the pursuit and/or interception tactic maneuvering. An improved method and apparatus provide the selection of the anti-collision maneuver by the vessel speed and/or course control. The improved apparatus is easy to use considering the minimal hand-operations.

While the above description contains many specificities, these should not be construed as limitations on the scope of the invention, but as exemplifications of the presently-preferred embodiments thereof. Many other ramifications are possible within the teachings to the invention. For example, an improved method and apparatus provide the elimination of the collision dangerous situation by visual dynamical simulation of the possible non-dangerous elements of the vessel movement (extrapolating of the future anti-collision disposition). It provides an eradication of the collision by pre-selection of the non-dangerous (harmless) pre-maneuver on the earlier and any non-critical stage.

Another ramification can be presented by the use of an improved method and apparatus for the vessel (for example, ship, submarine, airplane, missile) approach-receding process realization at the object pursuit-evasion and/or interception tactic maneuvering and/or for the collision avoidance of the own object group tactic maneuvering.

Also an improved apparatus can be used as an advanced navigation and/or tactic maneuvering trainer unit.

Thus the scope of the invention should be determined by the appended claims and their legal equivalents, and not by examples given.

What is claimed is:

1. A method for a control of a vessel maneuvering, including the steps of:

processing of initial signals, containing an information about a distance and bearing of at least one or each of a plurality of target objects, a vessel speed, a vessel course and about a speed and a course of said at least one or said each of said plurality of target objects;

forming a signals, containing an information about borders of at least one or each of a plurality of dangerous relative course zones for said vessel with regard to an appropriate said at least one or said each of said plurality of target objects, wherein said borders are characterized by a vessel maximal speed value arc and lines, determining by parameters:

i=1, 2, 3, . . . , m, . . . , n representing an ordinal number of each target object, j=0, 1, 2, . . . , k, . . . , l representing an ordinal moment of the time, considering the discrete time process of the target object observation by a radar scanning, g=1, 2, . . . , h, . . . , p representing an ordinal number of the parameter, $\pi$=3.14 . . . , $D_i^j$ representing a distance between the vessel and the i-th target object at the j-th moment of the time, $B_i^j$ representing a bearing of the i-th target object at the j-th moment of the time, $R_{CR}$ representing a radius of a critical approach distance circle, $\Psi_{ig}^j$ representing a g-th angle of North for an appropriate g-th bordering line of said lines for the i-th target object at the j-th moment of the time, using the equation:

$$\Psi_{ig}^j=(B_i^j-\pi/2)\pm\arccos(R_{CR}/D_i^j);$$

processing said signals, containing said information about said borders of said at least one or said each of said plurality of dangerous relative course zones for said vessel with regard to said appropriate at least one or said each of said plurality of target objects;

forming a processed signals, containing an information about said at least one or said each of said plurality of dangerous relative course zones;

displaying said at least one or said each of said plurality of dangerous relative course zones.

2. The method of claim 1, wherein said equation is further presented through trigonometrical function either arcsin or arctan, or arcctn.

3. The method of claim 1, wherein said borders of said at least one or said each of said plurality of dangerous relative course zones for a surface moving vessel with regard to an appropriate at least one or each of a plurality of surface moving target objects are further presented by an appropriate two straight lines starting from a point, belonging to an appropriate target object speed-vector end, and wherein each of said appropriate two straight lines has a locus under an appropriate said angle $\Psi_{ig}^j$ of North $$\Psi_{i1}^j=(B_i^j-\pi/2)+\arccos(R_{CR}/D_i^j),$$

$$\Psi_{i2}^j=(B_i^j+\pi/2)-\arccos(R_{CR}/D_i^j),$$

and by an appropriate arc of a vessel maximal speed value circle, and wherein said vessel is marked at a point of a center of said vessel maximal speed value circle, and wherein said point of said center of said vessel maximal speed value circle also belongs to a point of said appropriate target object speed-vector beginning.

4. The method of claim 3, wherein said equations are further presented through trigonometrical function either arcsin or arctan, or arcctn.

5. The method of claim 1, wherein said borders of said at least one or said each of said plurality of dangerous relative course zones of a surface moving vessel with regard to an appropriate at least one or each of a plurality of surface moving target objects are presented by an appropriate two straight lines, each of which is respectively parallel to an appropriate tangent line to circles of radiuses respectively adequate to a vessel critical approach distance and to a target object critical approach distance, and wherein said appropriate two straight lines have a locus under an appropriate angles of North, and by an appropriate arc of a vessel maximal speed value circle, and wherein said vessel is marked at a point of a center of a vessel maximal speed value circle.

6. The method of claim 1, wherein said borders of each of said plurality of dangerous relative course zones for each surface moving target object with regard to a surface moving vessel are presented by an appropriate two straight lines starting from a point, belonging to said surface moving vessel speed-vector end, and wherein each of said appropriate two straight lines have a locus under an appropriate angle of North, and by an appropriate arc of an appropriate target object maximal speed value circle, and wherein an appropriate said surface moving target object is marked at a point of a center of said appropriate target object maximal speed value circle.

7. The method of claim 1, wherein a border of said at least one or said each of said plurality of dangerous relative course zones for a spatial moving vessel with regard to an appropriate at least one or each of a plurality of spatial moving target objects is presented by an appropriate regular or an appropriate irregular cone of revolution with a vertex at a point, belonging to a point of an appropriate target object speed-vector end, and by an appropriate portion of a spatial surface, and wherein an appropriate target object speed-vector beginning is marked at a point of a regular or a conventional center of said spatial surface.

8. An apparatus for a control of a vessel maneuvering, including:

an initial data processing means, processing of initial signals containing an information about a distance and a bearing of at least one or each of a plurality of target objects, a vessel speed, a vessel course and about a speed and a course of said at least one or said each of said plurality of target objects, and wherein said initial data processing means comprises an output and five inputs;

a dangerous criteria setting means, an object disposition evaluation means, a dangerous relative course zone determination means, a control means, forming a signals containing an information about borders of at least one or each of a plurality of dangerous relative course zones for said vessel with regard to an appropriate said least one or said each of said plurality of target objects, wherein said borders are characterized by a vessel maximal speed value arc and lines, each of which has a locus under an appropriate angle of North $$\Psi_{ig}^j=(B_i^j-\pi/2)\pm\arccos(R_{CR}/D_i^j)$$

processing said signals containing said information about said borders of said at least one or said each of said plurality of dangerous relative course zones for said vessel with regard to said appropriate at least one or said each of said plurality of target objects, and forming a processed signals containing an information about said at least one or said each of said plurality of dangerous relative course zones, and wherein said dangerous criteria setting means comprises an input and two outputs, said object disposition evaluation means comprises three inputs and two outputs, said dangerous relative course zone determination means comprises an output and six inputs, said control means comprises an output;

a displaying means, displaying a vessel speed-vector, a critical approach distance circle with a center, belonging to a beginning of said vessel speed-vector, and said at least one or said each of said plurality of dangerous relative course zones, and wherein said displaying means comprises six inputs, and wherein:

a first input of said initial data processing means is connected to a fifth input of said displaying means and to a vessel speed and course sensors, a second input of said initial data processing means is connected to a fourth input of said dangerous relative course zone determination means, to a radar means and to a second input of said displaying means, a third input of said initial data processing means is connected to said input of said dangerous criteria setting means, to a third input of said object disposition evaluation means, to said output of said control means, to a sixth input of said dangerous relative course zone determination means and to a fourth input of said displaying means, a fourth input of said initial data processing means is connected to a sixth input of said displaying means and to said radar means;

a first input of said object disposition evaluation means is connected to said output of said initial data processing means and to a first input of said dangerous relative course zone determination means, a second input of said object disposition evaluation means is connected to a first output of said dangerous criteria setting means and to a third input of said dangerous relative course zone determination means;

a first input of said displaying means is connected to a first output of said object disposition evaluation means, a third input of said displaying means is connected to said output of said dangerous relative course zone determination means;

a second input of said dangerous relative course zone determination means is connected to a second output of said dangerous criteria setting means, a fifth input of said dangerous relative course zone determination means is connected to a second output of said object disposition evaluation means.

9. The apparatus of claim 8, further comprising a multiplexed bus, which provides the connections between said initial data processing means, said dangerous criteria setting means, said displaying means, said object disposition evaluation means, said dangerous relative course zone determination means, said control means, said radar and said vessel speed and course sensors.

10. The apparatus of claim 9, wherein said multiplexed bus further comprises a data bus and an address bus.

11. The apparatus of claim 8, wherein said dangerous relative course zone determination means includes an interface-signal distribution means connected to a data processing system.

12. The apparatus of claim 11, wherein said data processing system comprises a trigonometric function processing means, a summarizing means, a multiplying-dividing means, a data processing means, a logic processing and signal distribution means, connected to each other.

* * * * *

UNITED STATES PATENT AND TRADEMARK OFFICE
CERTIFICATE OF CORRECTION

PATENT NO. : 5,969,665
DATED : October 19, 1999
INVENTOR(S) : Aleksandr L. Yufa

It is certified that error appears in the above-identified patent and that said Letters Patent is hereby corrected as shown below:

Column 3, line 45, change "the metrol-" to --the meteorol--.

Column 3, line 46, change "ogy conditions" to --ogical conditions--.

Column 4, line 1, change "is connected" to --is connected to--.

Column 4, line 46, change "(TFM)" to --(arccos)--.

Column 4, line 47, change "(E)" to --($\Sigma$)--.

Column 7, line 7, change "(PG $|$ $E_i^0 M_i^0$ see Fig.6) and PK (PK $|$ $E_i^0 W_i^0$)" to --(PG $\|$ $E_i^0 M_i^0$ see Fig.6) and PK (PK $\|$ $E_i^0 W_i^0$)--.

Column 7, line 27, change "alphabet-number" to --alphabet-numerical--.

Column 8, line 23, change "$\Psi_{ik}^j$ ($\Psi_{i1}^j=\Psi_{i2}^j=\Psi_{i3}^j=\Psi_{i4}^j$)" to --$\Psi_{i2}^j-\Psi_{i1}^j=\Psi_{i4}^j-\Psi_{i3}^j$--.

Column 8, line 24, change "proportional to $2\Psi_{i3}^j$" to --proportional to--.

Column 8, line 25, change "($\Psi_{i3}^j=\Psi_{i4}^j$) and to $2\Psi_{i1}^j$ ($\Psi_{i1}^j=\Psi_{i2}^j$)" to --$\Psi_{i2}^j-\Psi_{i1}^j$ and $\Psi_{i4}^j-\Psi_{i3}^j$ ($\Psi_{i2}^j-\Psi_{i1}^j\neq\Psi_{i4}^j-\Psi_{i3}^j$)--.

Column 8, last line, change "target objects and" to --target objects, and--.

Column 9, line 1, change "is accompanied by" to --are accompanied with--.

Column 9, line 35, change " on the j+1)" to --on the (j+1)-th--.

UNITED STATES PATENT AND TRADEMARK OFFICE
CERTIFICATE OF CORRECTION

PATENT NO. : 5,969,665
DATED : October 19, 1999
INVENTOR(S) : Aleksandr L. Yufa

It is certified that error appears in the above-identified patent and that said Letters Patent is hereby corrected as shown below:

Column 9, line 36, change "The j+1)-th" to --The (j+1)-th--.

Column 11, line 22, change "$E_i$ (i=1)" to --$E_I$ (i=1)--.

Column 11, line 24, change "and $V_{EI}{}^j$, $C_{EI}{}^j$" to --and $V_{EI}{}^j$, $C_{EI}{}^j$--.

Column 14, line 33, change "least one or said each" to --at least one or said each--.

Claim 1, line 8 (equation), change "$\Psi_{ig}{}^j=(B_i^j-\pi/2)\pm\arccos(R_{CR}/D_i^j)$" to --$\Psi_{ig}{}^j=(B_i^j\mp\pi/2)\pm\arccos(R_{CR}/D_i^j)$--.

Claim 8, line 37 (equation), change "$\Psi_{ig}{}^j=(B_i^j-\pi/2)\pm\arccos(R_{CR}/D_i^j)$" to --$\Psi_{ig}{}^j=(B_i^j\mp\pi/2)\pm\arccos(R_{CR}/D_i^j)$--.

Abstract, line 16, change "proving the operator" to --providing the operator--.

Signed and Sealed this

Twenty-fifth Day of July, 2000

Q. TODD DICKINSON

*Attest:*

*Attesting Officer*   *Director of Patents and Trademarks*